(12) United States Patent
Miller

(10) Patent No.: US 7,670,402 B2
(45) Date of Patent: Mar. 2, 2010

(54) RADIAL SEAL FOR AXIAL FLOW AIR FILTER

(75) Inventor: Stuart Miller, Kalamazoo, MI (US)

(73) Assignee: Mann & Hummel GmbH, Ludwigsburg (DE)

(*) Notice: Subject to any disclaimer, the term of this patent is extended or adjusted under 35 U.S.C. 154(b) by 323 days.

(21) Appl. No.: 11/742,748

(22) Filed: May 1, 2007

(65) Prior Publication Data

US 2007/0251201 A1 Nov. 1, 2007

Related U.S. Application Data

(60) Provisional application No. 60/796,153, filed on May 1, 2006.

(51) Int. Cl.
*B01D 46/00* (2006.01)

(52) U.S. Cl. .................... 55/502; 55/385.3; 55/498; 55/503; 55/521

(58) Field of Classification Search .............. 55/385.3, 55/498, 502, 521, 503, 504; 123/198 E
See application file for complete search history.

(56) References Cited

U.S. PATENT DOCUMENTS

| 5,755,844 | A | 5/1998 | Arai et al. | |
|---|---|---|---|---|
| 7,396,377 | B2* | 7/2008 | Lampert et al. | 55/502 |
| 2005/0060972 | A1 | 3/2005 | Gieseke et al. | |
| 2005/0229563 | A1* | 10/2005 | Holzmann et al. | 55/502 |
| 2007/0186528 | A1* | 8/2007 | Wydeven et al. | 55/498 |

FOREIGN PATENT DOCUMENTS

GB 2 293 335 A 3/1996

OTHER PUBLICATIONS

European Search Report dated Sep. 28, 2007 Including English translation of the pertinent portion (Ten (10) pages).

* cited by examiner

*Primary Examiner*—Michael A Marcheschi
*Assistant Examiner*—Robert A Clemente

(57) ABSTRACT

An air cleaner located in the air intake tract of an internal combustion engine includes a filter housing, a filter element, and a sealing ring. The sealing ring comprises a support rim and a lip seal. The sealing ring is adapted to form a seal between an internal annular sealing surface of the filter housing and an interior annular sealing surface of a sealing band that is attached to one axial end of the filter element.

13 Claims, 4 Drawing Sheets

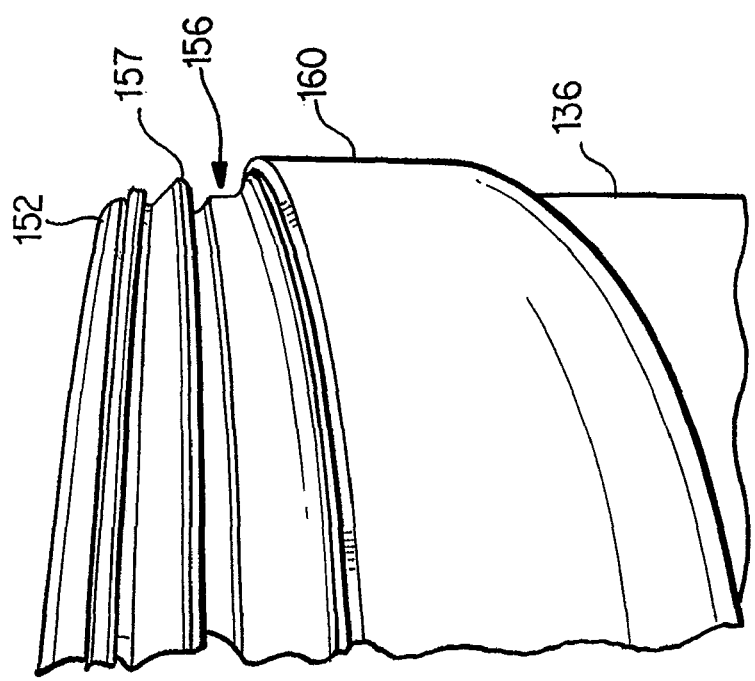
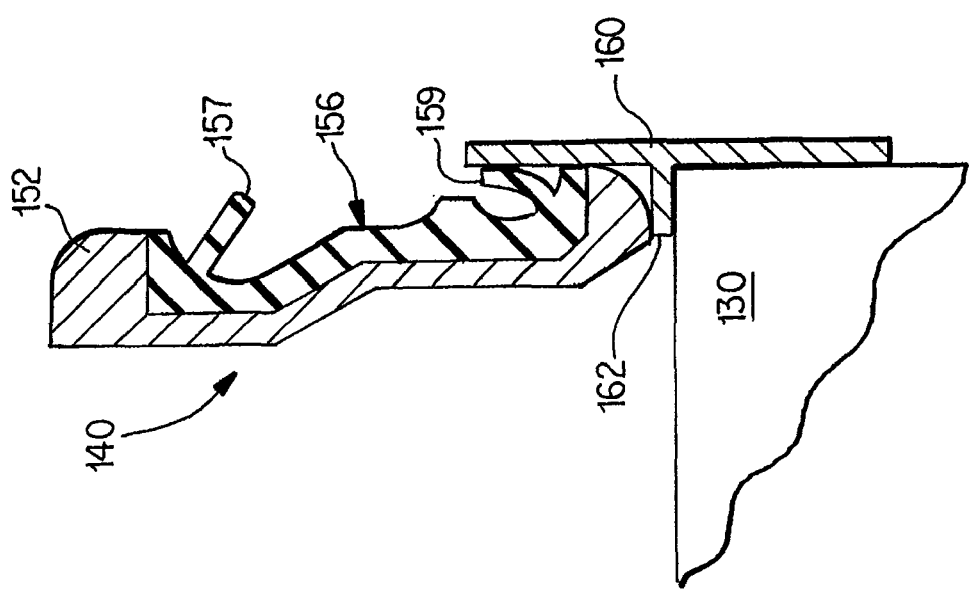
FIG. 5b
FIG. 5a

RADIAL SEAL FOR AXIAL FLOW AIR FILTER

CROSS REFERENCE TO RELATED APPLICATION

This application claims priority based on U.S. provisional patent application No. 60/796,153, filed May 1, 2006.

BACKGROUND OF THE INVENTION

This invention relates to an improved air cleaner for an internal combustion engine. The air cleaner comprises a filter housing having a filter element contained therein. More particularly, the invention relates to a radial sealing system for providing a seal between the filter housing and the filter element.

During the operation of an internal combustion engine, it is desirable to remove particulate matter from the air intake of the engine in order to reduce engine damage and the attendant operational inefficiencies that can result from ingestion by the engine of particles and debris. Accordingly, a variety of air cleaner systems have been developed to filter engine intake air.

Many conventional air cleaner systems include a filter element contained within a filter housing and a seal provided between the filter element and the housing. In many such systems, however, the seal is integrated with the filter element and thus is discarded each time the filter element is replaced. Further, in many such systems the seal can interfere with air flow through the filter element, which can have adverse effects on the operation of the engine. Finally, because of the high force required to form and break a robust seal in many such conventional radial sealing systems, replacement and/or maintenance of the filter element can be difficult.

Accordingly, it would be advantageous to provide a radial sealing system for the air cleaner of an internal combustion engine that is capable of easy installation and removal, and which provides an efficient and low-cost alternative to existing sealing systems.

SUMMARY OF THE INVENTION

It is an object of the invention to provide a radial seal that is compatible with existing air cleaner systems.

Another object of the invention is to provide an air cleaner comprising a mass air flow sensor having an improved signal.

A further object of the invention is to provide an air cleaner having improved field serviceability.

These and other objects are achieved in accordance with the present invention by providing a radial sealing system. The radial sealing system comprises a filter housing, a filter element and a sealing ring. The filter housing defines a filter receptacle chamber having an internal annular sealing surface. The filter element is fitted within the filter receptacle chamber and has attached thereto an annular sealing band having an interior annular sealing surface. The sealing ring comprises a support rim and a lip seal. According to an embodiment, the lip seal is molded over the support rim. The sealing ring is adapted to form a seal between the filter housing and the filter element sealing band.

According to one embodiment, an annular gap formed between an outer circumferential surface of the filter element and an inner surface of the filter housing is less than about 2% of a diameter of the filter element. According to a further embodiment, the sealing ring has radial profile of less than about 10%.

Advantageously, the sealing ring is supported axially by the internal annular sealing surface of the filter housing. The lip seal can comprise a first lip and a second lip each located on an outer circumferential surface of the sealing ring such that the first lip is adapted to form a seal with the internal annular sealing surface of the filter housing, and the second lip is adapted to form a seal with the interior annular sealing surface of the sealing band. Alternatively, the support rim and the housing can comprise a unitary part such that the lip seal comprises a single lip adapted to form a seal with the interior annular sealing surface of only the sealing band.

According to yet a further embodiment, the first lip and the second lip are inclined inwardly with respect to an axial direction of the sealing ring. Each lip preferably forms an angle of between about 30° and 60° with respect to its respective contact surface.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which:

FIG. 4b shows a perspective image of an assembled double lip sealing ring as shown in FIG. 4a;

FIG. 5a shows a cross-sectional schematic view of a partially assembled radial sealing system; and.

FIG. 5b shows a perspective image of a partially assembled radial sealing system as shown in FIG. 5a.

DETAILED DESCRIPTION OF PREFERRED EMBODIMENTS

Figure 1:
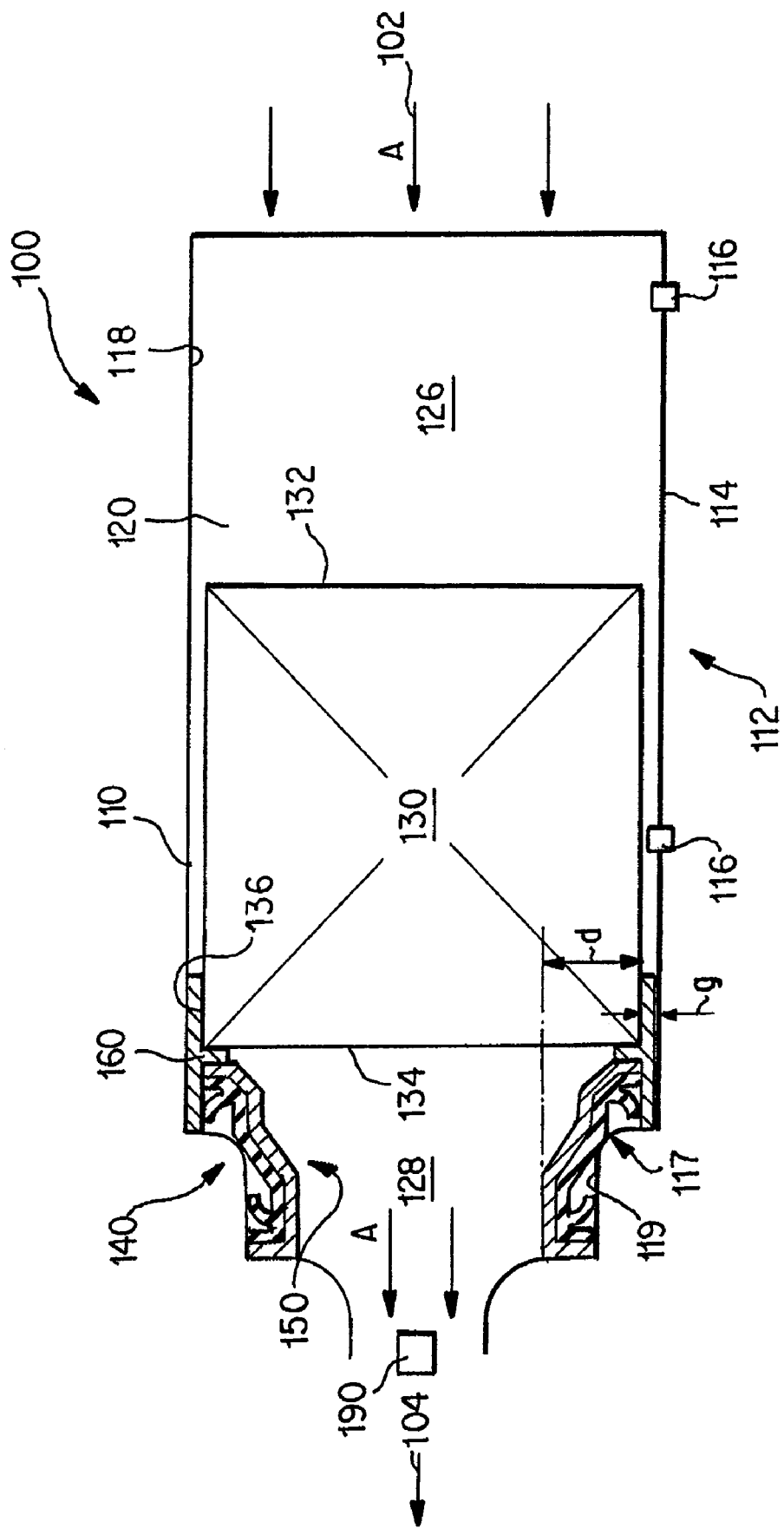
FIG. 1 shows a schematic diagram of an air cleaner comprising a filter housing, a filter element, and a sealing ring between the filter housing and the filter element.

Referring to FIG. 1, air cleaner 100 is located in the air intake tract of an internal combustion engine and includes a filter housing 110 defining a filter receptacle chamber 120 into which filter element 130 is inserted. The direction of airflow during operation of the internal combustion engine is from an upstream side 102 toward a downstream side 104 of the air cleaner in the direction of a longitudinal axis of the filter element as indicated by the arrows (A) in FIG. 1.

The filter element 130 preferably comprises a substantially cylindrical cross section having a first flow face 132 at an inlet end thereof, and a second flow face 134 at an outlet end thereof. A filter element typically comprises an axially-wound layer or bundled layers of filter media such as one or more layers of corrugated paper having a plurality of flutes. As illustrated, the filter element 130 fits inside receptacle chamber 120, which has a similar cylindrical cross section. However, each of the receptacle chamber 120 and the filter element 130 can have a non-circular (e.g., oval) cross section.

As illustrated, the filter housing 110 comprises an opening 112 formed in a sidewall thereof and a housing cover 114 that is fixedly attached to the housing using attachment elements 116. With such a configuration, the filter element 130 can be inserted into and removed from the receptacle chamber 120 via opening 112.

When the filter element 130 is introduced into the receptacle chamber 120 via an opening in the sidewall, insertion of the filter element comprises a two-step operation involving the lateral insertion of the filter element through the opening, and the subsequent axial displacement of the filter element in the downstream direction in order to form a robust seal between filter element 130 and sealing ring 150. Likewise, removal of the filter element comprises first axially displacing the filter element in an upstream direction in order to break a robust seal between the filter element 130 and sealing ring 150, and then removing the filter element from the filter housing via the opening.

Formed at an upstream side of the filter housing 110 there is an intermediate space 126 in receptacle chamber 120, which can be used to accommodate an axial displacement of filter element 130 during insertion into and removal from receptacle chamber 120.

In lieu of providing an opening in the sidewall, an opening for inserting and removing the filter element 130 can be provided at an axial end (upstream end) of the filter housing such that the filter element can be introduced into the receptacle chamber using only an axial displacement in order to accomplish both the insertion (removal) of the filter element and the formation (breaking) of the robust seal.

A preferred air cleaner 100 comprises an in-line flow geometry wherein unfiltered air enters the filter housing in one direction and, after passing through the filter element 130, filtered air exits the filter housing in substantially the same direction. The filter element is adapted to remove particulate matter and debris from air passing through the air cleaner.

The receptacle chamber 120 preferably has a circular cross section having a first diameter and a first axial length. A plenum volume 128 is located at a downstream side of the receptacle chamber 120, and is defined by an interior surface of the housing 119 and the second flow face 134. The plenum volume also defines a sealing chamber having interior surface 119. The sealing chamber preferably has a circular cross section having a second diameter smaller than the first diameter, and a second axial length shorter than the first axial length. As a result, there is a step 117 between the receptacle chamber 120 and the sealing chamber. The interior surface 119 of the sealing chamber provides a rigid annular sealing surface for forming a robust seal.

The air cleaner 100 further comprises a radial sealing system 140, which is adapted to provide a fluid-tight seal between the filter element 130 and the filter housing 110. By fluid-tight seal, it is meant that during operation of an internal combustion engine comprising the air cleaner 100, the sealing system 140 substantially prevents fluid flow (i.e., air flow) from passing between the filter element 130 and inner surfaces 118, 119 of the filter housing 110. In particular, a sealing ring 150 separates the upstream, unfiltered side 126 of the receptacle chamber, from the downstream, clean air side 128.

The radial sealing system, which includes a sealing ring and a filter element having a sealing band attached thereto, will now be described in detail with reference to FIGS. 2-5.

Figure 2:
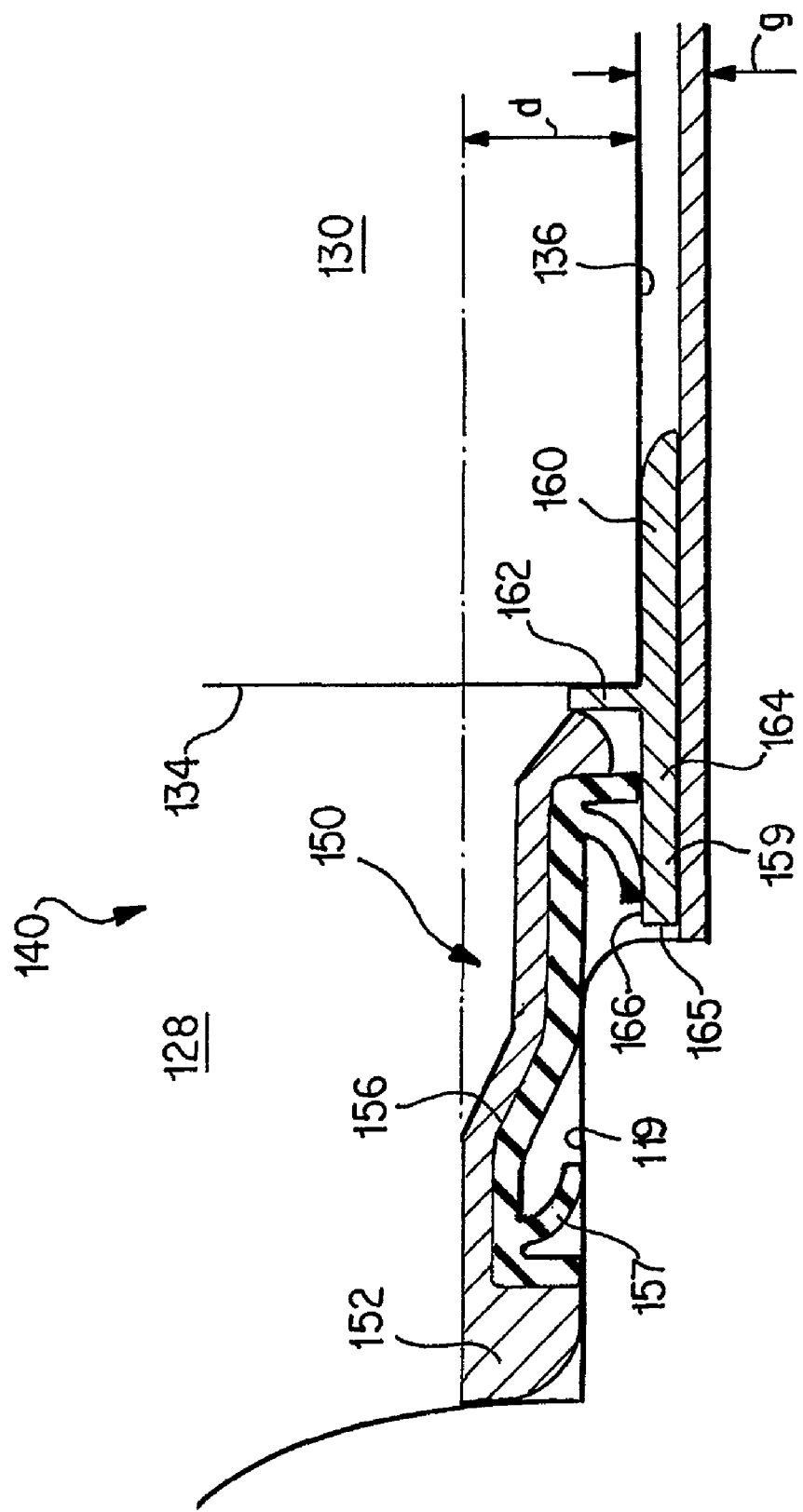
FIG. 2 shows a detailed view of the sealing ring of FIG. 1.

First, referring to FIG. 2, the radial sealing system 140 comprises a sealing band 160 that is adapted to be slideably fit over and preferably attached (e.g., via a permanent resin or other glue) to an outer circumferential surface 136 of filter element 130. A preferred sealing band has a wall thickness of about 2 mm. A filter element having an attached sealing band comprises a first component of the radial sealing system 140. Preferably, this first component comprises a disposable part, which can be removed from the air cleaner and replaced.

A plurality of radially extending locating tabs 162 formed on sealing band 160 inhibit the sealing band from sliding completely over outer surface 136. The sealing band includes an axially-extending portion 164 that, in its assembled condition, defines an interior annular sealing surface 166 configured to cooperate with a flexible lip to form a robust seal. When the filter element 130 having an attached sealing band 160 is inserted into the receptacle chamber 120, an axial end surface 165 of the axially-extending portion 164 abuts a surface of the step formed between the receptacle chamber 120 and the sealing chamber. This abutment serves to align the interior annular sealing surface 166 with a seal-forming lip.

Figure 3:
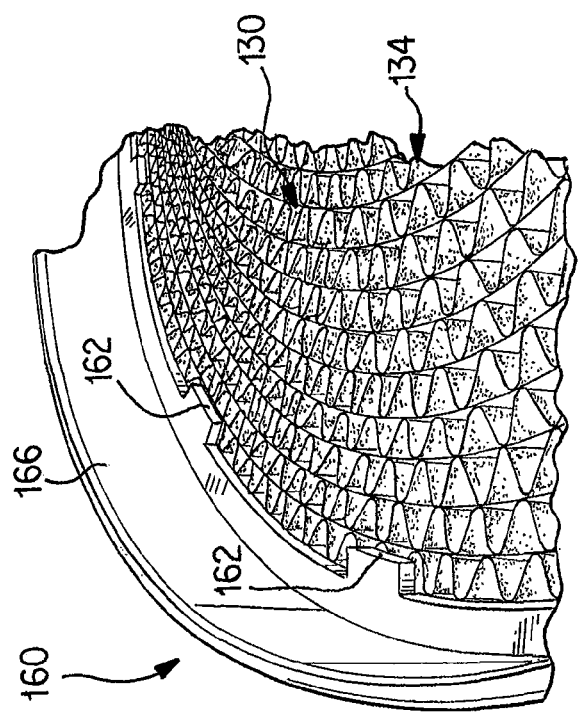
FIG. 3 shows a perspective image of a filter element and an attached sealing band.

A perspective image of a sealing band 160 attached to a filter element 130 is shown in FIG. 3. Also shown are annular sealing surface 166 and locating tabs 162. The locating tabs extend radially to cover only a small area of flow face 134 in order to minimally disrupt the clean side air flow. An optional second band (not shown), which can provide edge protection, can be attached at the opposite, upstream side of the filter element.

Referring back to FIG. 2, a second component of the radial sealing system comprises sealing ring 150, which includes a support rim 152 and a molded lip seal 156, which is formed on an outer circumferential surface of the sealing ring. A preferred sealing ring has a width (in the axial direction) of about 30 mm, and a preferred lip seal has a width of about 23 mm. The lip seal 156 is formed from a flexible material and, according to an embodiment, includes first lip 157 and second lip 159. The sealing ring 150 is adapted to be slideably fit over inner surface 119 of the filter housing. In an assembled state, first lip 157 contacts and forms a robust seal with inner surface 119, and second lip 159 contacts and forms a robust seal with sealing surface 166 of sealing band 160.

Advantageously, the sealing ring 150 need not be removed or replaced each time the filter element 130 is replaced. This may reduce the cost structure for the radial sealing system, particularly because the flexible material that forms the lip seal 156 makes the sealing ring a relatively expensive component.

The support rim 152 is configured to contain the hoop stresses in the assembled and installed sealing ring 150 without undergoing substantial deformation. The support rim 152 contacts and is supported radially by inner surface 119 of the filter housing. In contrast, because the diameter of the support rim 152 is reduced in the region of the sealing band 160, the support rim 152 does not contact the sealing surface 166 of the sealing band.

Figure 4A:
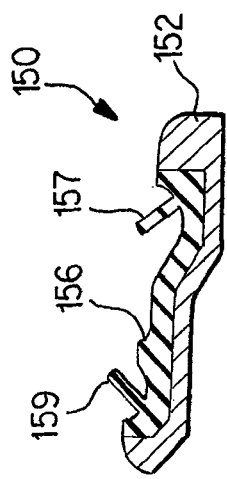
FIG. 4a shows a cross-sectional schematic view of an assembled double lip sealing ring.
Figure 4B:
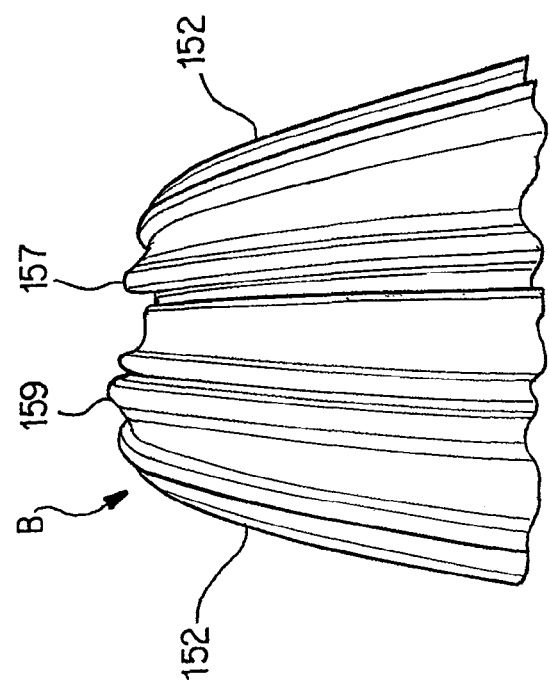

A cross-sectional schematic view of sealing ring 150 including first lip 157 and second lip 159 is shown in FIG. 4a. First lip 157 is configured to contact an inner surface of the housing and second lip 159 is configured to contact an interior sealing surface of the sealing band. A perspective image of this double lip seal ring is shown in FIG. 4b. As can be seen, the diameter of the support rim proximate to the second lip 159 (indicated by arrow B) is reduced such that the support rim, in its assembled configuration, does not directly contact the sealing surface 166.

FIG. 5a shows a cross-sectional schematic view of a partially assembled radial sealing system 140. A corresponding perspective image of the partially assembled radial sealing system is shown in FIG. 5b.

In FIGS. 5a-b, sealing band 160 is shown attached to filter element 130. First lip 157, which is adapted to make contact with an inner surface of the housing can be seen extending radially from lip seal 156. According to a preferred embodiment, each lip 157, 159 forms an angle with respect to its respective contact surface of less than about 60° but greater than about 30° (preferably about 45°).

Moreover, as shown in FIGS. 2-5, lips 157, 159 are angled toward each other (i.e., the downstream lip 157 is angled in the upstream direction, and the upstream lip 159 is angled in the downstream direction). With such an angled configuration, an increasingly robust seal is formed between each lip and its respective contact surface under the operating conditions of an internal combustion engine. That is, the relative vacuum produced in plenum volume 128 during operation of the engine acts to advantageously tighten each lip seal while the engine is running. Thus, the lip seal design of the invention advantageously accommodates design tolerances between various components in the air cleaner assembly, increases the sealing stress during engine operation, and provides an advantageously reduced insertion/removal force with respect to conventional seal sealing systems.

According to an embodiment, the double lip seal described above can be replaced by a single lip seal. In this alternate embodiment, the support rim structure is integrated into the housing such that the support rim and housing comprise a unitary part. A lip seal comprising a single lip adapted to form a seal with only the interior annular sealing surface 166 of sealing band 160 can be slideably fit over the integrated support rim.

Referring back to FIG. 1, a preferred air cleaner 100 comprises a mass air flow sensor 190 located within the filter housing downstream of the filter element 130. The plenum volume 128 provided between flow face 134 and the mass air flow sensor 190 is effective to reduce filter element-induced microturbulance of air exiting the filter element. The presence of the plenum volume, together with other aspects of the design of the radial sealing system described below, result in an improved signal quality (e.g., signal to noise ratio and transfer function) from the mass air flow sensor.

Minimal disruption of the airflow emerging from flow face 134 of filter element 130 can be obtained by minimizing the radial profile of the sealing ring 150. The radial profile (2d) of the sealing ring 150 is defined as the maximum projected overlap of the sealing ring with respect to the filter element 130. One half of the total radial profile (d) of sealing ring 150 is illustrated in FIGS. 1 and 2. Surprisingly, the radial profile of sealing ring 150 is substantially less than the radial profile found in many conventional sealing systems. According to an embodiment, the radial profile (2d) is less than about 10%.

The operating efficiency of both the mass air flow sensor and the engine can be improved by minimizing the gap (g) between the outer circumferential surface of the filter element and the inner surface 118 of the filter receptacle chamber 120. The gap (g) provides a measure of the volume of the receptacle chamber not filled by the filter element.

For a given diameter filter receptacle chamber, the maximum diameter of the filter element is reduced by the total gap (2g). A preferred filter element has an outside diameter of about 225 mm and the total gap (2g) is preferably less than about 4%, more preferably less than about 2%, of the filter element diameter.

Because both the effective face velocity of air exiting the filter element and the pressure drop of air across the filter element are inversely proportional to the filter element's cross sectional flow area, the pressure drop across a filter element can be decreased by decreasing (g). A larger effective filter area typically results in more efficient air delivery through the air cleaner to the engine, which in turn results in more available horsepower. Applicant has determined that the plenum volume, radial profile, and lateral gap of the radial sealing system of the invention result in improved function of both the mass air flow sensor and the engine.

Because the radial sealing system of the invention is interchangeable with conventional air cleaner sealing systems, manufacturers can upgrade to the radial sealing system of the invention with minimal design adjustments.

The double (or single) lip seal, which can be made using any suitable forming method such as injection molding or compression molding, is preferably formed from a flexible, elastomeric material. Exemplary materials for the lip seal include natural rubbers, synthetic rubbers, polyurethane, ethylene propylene dien rubber (EPDM), nitrile rubber (NBR), Santoprene™ thermoplastics, combinations of these materials, and composites thereof.

The support rim and the annular sealing band, which can be made using any suitable forming method such as injection molding, are preferably formed from a synthetic resin material. Exemplary materials for the support rim and the annular sealing band include polyurethane, polypropylene, nylon, combinations of these materials, and composites thereof.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A radial sealing system comprising:
   a filter housing defining a filter receptacle chamber having an internal annular sealing surface;
   a filter element having an axially arranged inlet flow face and an opposing axially arranged outlet flow face fitted within said filter receptacle chamber and having attached thereto an annular sealing band having an interior annular sealing surface extending longitudinally outwards from said filter element beyond an adjacent one of said flow faces; and
   a sealing ring comprising a support rim and a lip seal, said sealing ring adapted to form a seal between the internal annular sealing surface of said filter housing and the interior annular sealing surface of said sealing band.

2. The radial sealing system according to claim 1, wherein the annular sealing band is adapted to be slideably fit over an axial end surface of the filter element.

3. The radial sealing system according to claim 1, wherein an annular gap formed between an outer circumferential surface of the filter element and an inner surface of the filter housing is less than about 2% of a diameter of the filter element.

4. The radial sealing system according to claim 1, wherein the sealing ring has radial profile of less than about 10%, wherein said radial profile is defined as a maximum projected overlap of said sealing ring with respect to said adjacent one of said flow faces.

5. The radial sealing system according to claim 1, wherein the sealing ring is supported axially by the internal annular sealing surface of said filter housing.

6. The radial sealing system according to claim 1, wherein the lip seal comprises a first lip and a second lip, said first lip adapted to form a seal with the internal annular sealing surface of said filter housing, and said second lip adapted to form a seal with the interior annular sealing surface of said sealing band.

7. The radial sealing system according to claim 6, wherein the first lip and the second lip are inclined inwardly with respect to an axial direction of the sealing ring and the first lip forms an angle of between about 30 degrees and 60 degrees with respect to the internal annular sealing surface and the second lip forms an angle of between about 30 degrees and 60 degrees with respect to the interior annular sealing surface.

8. The radial sealing system according to claim 1, wherein the support rim and the housing comprise a unitary part and the lip seal comprises a single lip adapted to form a seal with the interior annular sealing surface of said sealing band.

9. The radial sealing system according to claim 1, wherein the annular sealing band is formed from a synthetic resin material.

10. The radial sealing system according to claim 1, wherein the support rim is formed from a synthetic resin material.

11. The radial sealing system according to claim 1, wherein the lip seal is formed from an elastomeric material.

12. The radial sealing system according to claim 1, wherein the lip seal is molded over the support rim.

13. A radial sealing system comprising:
 a filter housing defining a filter receptacle chamber having an internal annular sealing surface;
 a filter element fitted within said filter recertacle chamber and having attached thereto an annular sealing band having an interior annular sealing surface; and
 a sealing ring comprising a support rim and a lip seal, said sealing ring adapted to form a seal between the internal annular sealing surface of said filter housing and the interior annular sealing surface of said sealing band;
 wherein the annular sealing band comprises a plurality of radially extending locating tabs formed on an inner circumferential surface thereof.

* * * * *